UNITED STATES PATENT OFFICE.

OSCAR NASTVOGEL, OF ELBERFELD, GERMANY, ASSIGNOR TO FARBEN-FABRIKEN OF ELBERFELD CO., OF NEW YORK, N. Y., A CORPORATION OF NEW YORK.

YELLOW ACRIDIN DYE AND PROCESS OF MAKING SAME.

SPECIFICATION forming part of Letters Patent No. 716,084, dated December 16, 1902.

Application filed July 15, 1902. Serial No. 115,682. (Specimens.)

*To all whom it may concern:*

Be it known that I, OSCAR NASTVOGEL, doctor of philosophy, chemist, (assignor to the FARBENFABRIKEN OF ELBERFELD CO., of New York,) residing at Elberfeld, Germany, have invented a new and useful Improvement in Yellow Acridin Dyes and Processes of Making Same; and I hereby declare the following to be a clear and exact description of my invention.

It is known that the acridin dyestuffs having the following general formula:

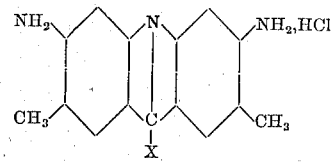

(X meaning a hydrogen atom which can be replaced by the phenyl radical)—*e. g.*, acridin yellow (see German Letters Patent No. 52,324) and benzoflavin (see United States Patent No. 382,832, dated May 15, 1888) have the disadvantage of being only slightly soluble in water, which is a great inconvenience in dyeing. I have, however, succeeded in preparing a series of salts of acridin yellow and of benzoflavin which are distinguished for great solubility in hot water and represent very valuable dyestuffs.

The process for the production of the new salts of the above-mentioned dyestuffs consists in treating the free bases of acridin yellow and benzoflavin with monobasic fatty acids or derivatives thereof. Among these acids the following may be enumerated as typical: formic acid, acetic acid, propionic acid, butyric acid, valeric acid, glycollic acid, lactic acid, or the like. The new salts of acridin dyestuffs thus obtained are from yellowish-brown to brown powders soluble in hot water and in alcohol with a yellow color and dyeing silk and cotton mordanted with tannin greenish-yellow shades.

In carrying out my process practically I can proceed as follows, the parts being by weight: Twenty-four parts of acridin yellow (free base prepared from the chlorohydrate by treatment with alkali) are triturated with one hundred parts of a five-per-cent. solution of formic acid. The resulting mixture is then evaporated to dryness on the water bath while being stirred. The new formate thus obtained is a yellowish-brown powder soluble in cold and readily soluble in hot water and in alcohol, producing yellow solutions showing a green fluorescence. On being heated with sulfuric acid formic acid is split off. It is soluble in concentrated sulfuric acid with a yellowish color, which turns reddish-brown by the addition of ice. The new formate dyes silk and cotton mordanted with tannin greenish-yellow shades. Very similar results are obtained if other monobasic fatty acids or if benzoflavin be used.

Having now described my invention and in what manner the same is to be performed, what I claim as new, and desire to secure by Leters Patent, is—

1. The herein-described process for preparing new dyestuffs of the acridin series, which process consists in first treating the hereinbefore-mentioned acridin bases with monobasic fatty acids and secondly isolating the dyestuffs thus produced, substantially as described.

2. The herein-described process for producing a new dyestuff of the acridin series, which process consists in first treating the free base of acridin yellow with a solution of formic acid and secondly isolating the resulting dyestuff, substantially as described.

3. The herein-described new dyestuffs which are derived from acridin bases and monobasic fatty acids, and which are from yellow-brown to brown powders soluble in water and in alcohol with a yellow color and dyeing silk and cotton mordanted with tannin greenish-yellow shades, substantially as hereinbefore described.

4. The herein-described new dyestuff which is derived from the base of acridin yellow, viz. diamido dimethylacridin and formic acid, and which is, when dry and pulverized, a yellowish-brown powder, soluble in cold and readily soluble in hot water and in alcohol producing yellow solutions showing a green fluorescence, soluble in concentrated sulfuric acid with a yellowish color which turns reddish-brown by the addition of ice, splitting off formic acid on being heated with sulfuric acid and dyeing silk and cotton mordanted with tannin greenish-yellow shades, substantially as hereinbefore described.

In testimony whereof I have signed my name in the presence of two subscribing witnesses.

OSCAR NASTVOGEL.

Witnesses:
OTTO KÖNIG,
FRITZ UBERS.